March 13, 1934.  G. P. PIGANEAU  1,950,950
SERVOMOTOR
Filed Nov. 29, 1932   2 Sheets-Sheet 1
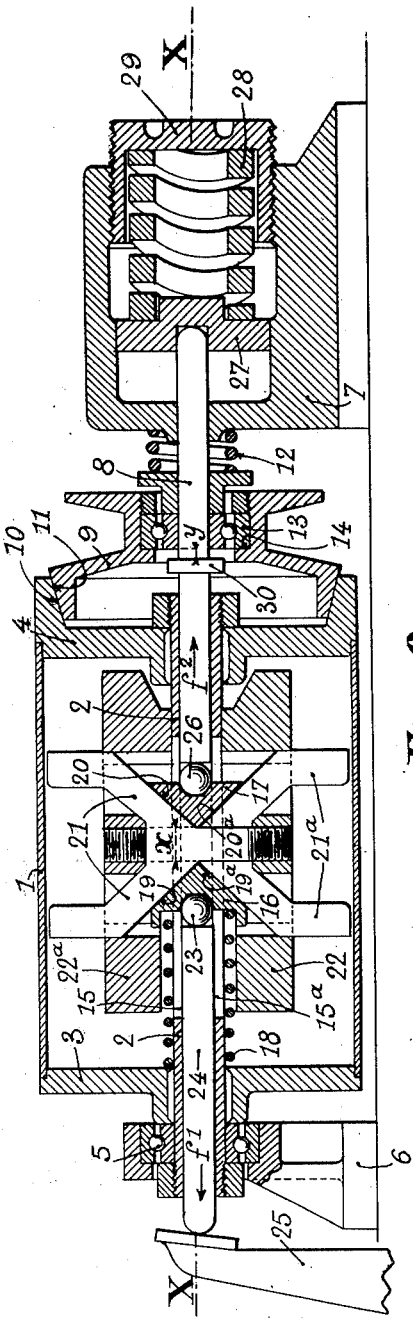
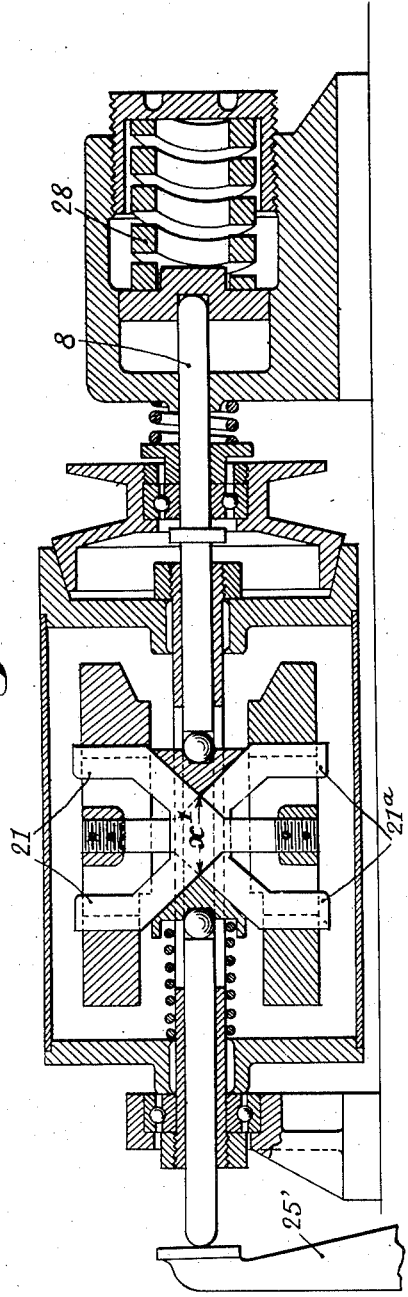
G. P. Piganeau
INVENTOR
By Marks & Clerk
Attys.

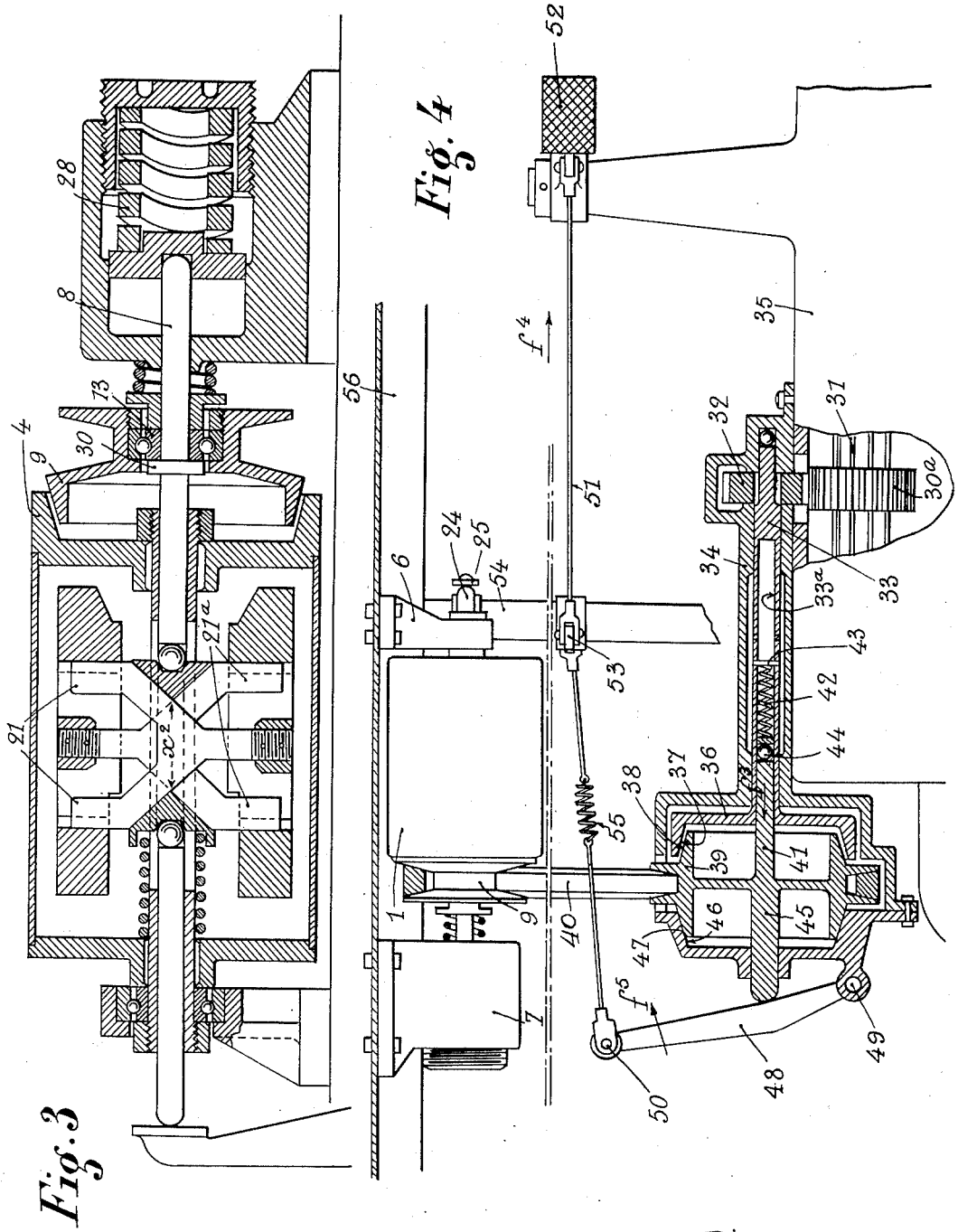

Patented Mar. 13, 1934

1,950,950

UNITED STATES PATENT OFFICE 1,950,950

SERVOMOTOR

Gérard Pierre Piganeau, Paris, France

Application November 29, 1932, Serial No. 644,898
In France December 14, 1931

8 Claims. (Cl. 188—140)

The present invention relates to an improved servo-motor of the centrifugal type, which is chiefly adapted for use as a servo-brake.

The known apparatus of this class offers serious drawbacks. Since the effort imparted by the heavy pieces subjected to centrifugal force is proportional to the square of the speed, it will follow on the one hand that the effort exercise will be normal for the slow speeds, and will hence be excessive and prohibitive for high speeds, as the mechanical parts cannot withstand such strains; or on the other hand, it will be normal for the high speeds and will thus be too small and therefore unavailable, at slow speeds. In the case of a servo-brake for motor vehicles, for instance, if the power of the mechanism is represented by 50 kilog. at 1000 R. P. M., it will reach the prohibitive value of 1250 kilog. at 5000 R. P. M.

The servo-motor according to the invention is chiefly characterized by the fact that it is constructed in such manner that the effective force produced by the apparatus will be automatically limited to a given maximum value, irrespectively of the increase in the speed of the heavy masses subjected to centrifugal force, above the speed corresponding to this predetermined maximum value of the effective force.

In one form of the apparatus, the centrifugal force produced by the heavy pieces is decomposed into two opposite forces, preferably equal, whereof one acts upon the element to be driven, and the other acts upon an elastic (or other) system having a determined resistance which is equal to the maximum value of the desired effective force.

In this manner, as long as the said equal and opposite forces produced by the rotating system are less than the resistance of the elastic device, they will increase as the speed of the rotating system increases, and when these forces become equal to the resistance of the elastic device, this latter will be subject to deformation, and thus the said forces will be maintained at a constant value, provided, however, that the resistance of the elastic system remains constant in spite of its deformation.

According to another feature of the invention, it is possible to take advantage of this deformation of the elastic system, for the driving of a mechanism by which the rotary device subjected to centrifugal force will be uncoupled, in such manner that when the speed of said device decreases the centrifugal force will also be reduced, thus attaining a state of equilibrium in the limit positions, corresponding to the beginning of the deformation of the elastic system.

It will thus be observed that owing to the aforesaid improvements, the servo-motor can be used in normal conditions for a great range of speeds of the device by which it is driven. In the case of a servo-brake for motor vehicles, the servo-motor can be employed in an approved manner from very slow speeds approaching zero, up to very high speeds, corresponding for instance to direct drive at the highest speeds of the engine.

In the accompanying drawings, which are given solely by way of example:

Fig. 1 is a lengthwise section of an apparatus in conformity to the invention, which is shown in the idle position.

Fig. 2 is a like section of the apparatus, showing the position of the parts at the time when the elastic system is about to undergo deformation.

Fig. 3 is a like section of the apparatus, in the uncoupled position.

Fig. 4 is a diagrammatic view showing the use of the apparatus as a servo-brake upon a motor vehicle.

In the form of construction shown in Fig. 1, the apparatus comprises a tube casing 1 which connects and is held between end-plates 3 and 4, keyed to a tube 2 which is provided with a tightening nut at each end. On the left, the tube 2 is mounted by means of a ball bearing 5 upon a frame 6, and on the right, the said tube rests upon a frame 7 by means of a shaft 8 which is slidable in the tube 2. The casing 1 and with it, the tube 2, can be rotated by any suitable means, such as a pulley 9 having a surface 10 in the form of a male cone, which is urged, when in the idle position, against a female cone 11 formed in the end-plate 4, by a spring 12 which is in contact at one end with the frame 7 and at the other end with a ball bearing 13 which makes contact with a shoulder 14 provided on the pulley 9.

Within the casing 1, the tube 2 carries two longitudinal slots 15—15a in diametrically opposite position, in which are slidable two wedge-shaped plates or blocks 16—17, which are held in contact by a spring 18 with the inclined faces 19—19a and 20—20a of two respective fork-shaped members 21—21a. The two spreading branches of each member 21—21a serve as guides for a respective heavy piece 22—22a which is secured to the central branch of the other fork-shaped member.

As will be observed by comparing Figs. 1 to 3, the distance between the heavy pieces 22—22a and the axis X—X, will depend upon an increase $x^1$—$x^2$ of the distance $x$ between the points representing the intersection of the surfaces 19—19a and 20—20a.

The block 16 bears by means of a ball 23, on a rod 24 whose end emerges from the tube 2 on the left hand and is adapted to drive (according to the arrow $f^1$) a lever 25, which is urged against the rod 24 by suitable elastic means, such as the reaction spring of the brake pedal or of the brake shoes, or of these two springs at the same time in the case in which the lever 25 serves to control a brake, the brake being applied when the lever moves in the direction of the arrow $f^1$.

The block 17 bears in like manner, by means of a ball 26, on the rod 8 which is slidable in the frame 7 and makes contact at its end with a member 27 slidable in the frame 7 and bearing against a spring 28 of determined force which is in contact at its outer end with an adjusting plug 29 screwed into the frame 7.

The rod 8 comprises a shoulder 30 which after moving for a very short distance $y$ to the right, comes against the ball bearing 13.

The operation is as follows. In the idle position, the heavy pieces 22—22a secured to the central branches of the members 21—21a are brought near the axis X—X (Fig. 1) by the blocks 16—17 which are acted upon by the spring 18. The lever 25 is in the idle position. On the other hand, the shoulder 30 of the rod 8 is at a short distance $y$ from the ball bearing 13, and the pulley 9 is held in contact with the tapered part 11 of the end-plate 4 by the spring 12.

When the pulley 9 is set in rotation, this rotates the end-plate 4, the casing 1, the tube 2 and the heavy pieces 22—22a, which latter move apart under the action of the centrifugal force, which increases with the speed of rotation. The centrifugal force F produces two axial components $F^1$ and $F^2$, equal and opposite, having the direction X—X, which act respectively upon the rods 24 and 8 in the direction of the arrows $f^1$ and $f^2$. For a slow speed of rotation, the force $F^2$ is unable to overcome the resistance R of the spring 28, but for a value N of the speed of rotation of the heavy pieces 22—22a, the force $F^2$ finally becomes equal to the elastic force of the spring ($F^2$=R). As to the force $F^1$, which is always equal to $F^2$, it moves the lever 25 to the left by means of the rod 24, thus performing the desired useful work that is the applying of the brakes. This force $F^1$ may increase as far as any desired value, due to a proper choice of the spring 28 and the adjustment of the tension of the spring by the threaded plug 29.

When the opposing forces $F^1$ and $F^2$ have become equal to R, which corresponds to a speed N of the heavy pieces 22—22a, the apparatus will have the position shown in Fig. 2. The lever 25 has now reached the point 25'; the heavy pieces have moved farther from the axis X—X; the rod 8 has not as yet been moved to the right, and the force $F^2$ is counter-balanced by the resistance R of the spring 28.

When the speed of rotation of the heavy pieces exceeds the value N, the forces $F^1$ and $F^2$ become somewhat greater than R, and the spring 28 yields (Fig. 3). The rod 8 moves to the right, and the shoulder 30 makes contact with the ball bearing 13 and separates the pulley 9 from the end-plate 4, thus uncoupling the device.

The speed of the heavy pieces 22—22a is at once reduced, the forces $F^1$ and $F^2$ decrease, and when they fall below R, the spring 28 preponderates, thus driving the rod 8 to the left, and releasing the ball bearing 13. Under the action of the spring 12, the clutch 9—4 is thrown on, and the device is again actuated. In fact, a condition of equilibrium is set up, in which the force exercised upon the lever 25 will remain equal to R÷ε, in which ε corresponds to the degree of yielding $y$ of the spring 28.

Obviously, the apparatus need not be provided with a clutch but in this case, when operating above the speed N, the forces $F^1$ and $F^2$ would always be equal to the reaction of the spring 28. Should this reaction remain constant, this would be most favourable, but if it should increase as the length of the spring is reduced, this would result in a corresponding increase of the force imparted to the lever 25 by the device. This arrangement would have another drawback, consisting in the fact that the whole mechanism is operated at great speeds, which might be prohibitive. On the contrary, with the use of the clutch, this speed will not exceed the value N.

It should be further noted that the casing 1 might have the fixed position. However, it is advantageous that it should maintain a constant position with reference to the heavy pieces 22—22a, as the lubricant in the casing is not stirred up, which would absorb energy.

Obviously, the apparatus herein described can be employed for numerous purposes, and as above indicated, it is chiefly adapted for the servo-brakes of vehicles.

For the sake of explanation, Fig. 4 shows one arrangement which may be employed for the control of the apparatus in this case.

In this example, a pinion 30a, which is keyed, for instance, to the intermediate shaft 31 of the change-speed box of the vehicle (or to any other part participating in the rotation of the vehicle wheels), is in permanent engagement with a pinion 32 keyed to a shaft 33 which is contained in a sleeve or casing 34 which is formed in one with or is secured to the casing 35 of the change-speed device. At the end of the shaft 33 is mounted a disc 36 having a female tapered surface 37 co-operating with the male surface 38 of a grooved pulley 39 adapted to drive the pulley 9 of the servo-brake by a belt 40. The pulley 39 is mounted on a rod 41 which is slidable in a longitudinal bored recess 33a in the shaft 33. The rod 41 is loosely mounted in said recess, and is urged to the left in the direction of the arrow $f^3$, by a spring 42, in contact at one end with a pin 43, or like stop, and at the other end with the end of the rod 41, by means of a ball 44. At the end opposite the rod 41, the pulley 39 carries a push-piece 45, whose end projects from the casing 34. In the said casing 34 is formed a tapered contact 46, against which the pulley 39 is urged, on its tapered surface 47, by the spring 42.

The pulley 39 may be moved to the right, contrary to the arrow $f^3$, by a lever 48 acting upon the push-piece 45; said lever is pivotally mounted on the casing at 49, and its outer end 50 is connected by a rod 51 with a brake pedal 52. The rod 51 also controls (by a lever 53) the shaft 54 to which is keyed the lever 25 subjected to the action of the push-rod 24 of the servo-brake. The shaft 54 controls the brakes by the usual intermediate gear.

A spring 55, adapted to maintain a constant value for the stroke, is mounted on the rod 51, between the lever 53 and the point 50 at which the said rod is attached to the lever 48.

The servo-brake may be secured by its bearings 6—7, to one of the side beams 56 of the vehicle frame, for instance.

The operation is as follows: When the brake pedal 52 is pressed down, this draws the rod 51 in the direction of the arrow $f^4$, and the brakes are operated directly by means of the lever 53. At the same time, this action draws forward the lever 48, which pivots about the axle 49 in the direction of the arrow $f^5$, thus driving the pulley 29 to the right and bringing it into engagement with the tapered clutch member 37 which is constantly rotated by the change-speed mechanism. When the tapered parts 37 and 38 are in contact, the lever 48 becomes stationary, but the pedal 52 may still be moved, due to the spring 55 by which the stroke is lengthened.

It should be observed that the pedal is not practically any harder to operate on this account, as the spring 55 has but a small force, and it is simply necessary, in fact, that it should be somewhat stronger than the weak reaction spring 42 in order that the clutching operation may be effected, at the start, without stretching this spring 55.

When the clutch has been engaged at 37—38, the servo-brake is thus set in operation, and its action is added to the direct action of the pedal 52.

The fact that the brakes can be directly applied by the pedal 52, conjointly with the action of the servo-brake, offers great advantages. On the one hand, it constitutes a safety device if the servo-brake should fail to operate, and on the other hand, the brake shoes can be brought near their drums during the first part of the stroke of the pedal, corresponding to the inoperative period of the clutching of the servo-brake, this period being reduced to a minimum by eliminating the first resistance offered to the push-pieces.

Upon releasing the pedal 52, the brakes are thrown off by their reaction devices, the spring 55 expands, and since the lever 48 is now released, the spring 42 disengages the pulley 39 and moves it to the left, thus bringing it into contact, by its tapered part 47, with the fixed tapered part 46 by which it is held fast, and the servo-brake is thus stopped.

It should be noted that the driving belt of the servo-brake is only in movement during the braking periods.

Obviously, the said invention is not limited to the forms of construction herein described and represented, which are given solely by way of example.

Having now described my invention what I claim as new and desire to secure by Letters Patent is;

1. A centrifugal servo-brake comprising in combination a rotatable shaft, means for rotating said shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a brake operating member acted upon by one of said sliding members, and yielding means bearing on the other sliding member and adapted to yield under a given determined pressure.

2. A centrifugal servo-brake comprising in combination a rotatable shaft, means for rotating said shaft, clutching means interposed between said shaft and said means for rotating said shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a brake operating member acted upon by one of said sliding members, yielding means bearing on the other sliding member and adapted to yield under a given determined pressure, elastic means adapted to urge said clutching means into operative position, and means operated by said other sliding member and adapted to bring said clutching means into inoperative position.

3. A centrifugal servo-brake comprising in combination a rotatable shaft, means for rotating said shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a brake operating member acted upon by one of said sliding members and adjustable yielding means bearing on the other sliding member and adapted to yield under a given determined pressure.

4. A centrifugal servo-brake comprising in combination a rotatable shaft, a driving clutching member freely rotatable coaxially with said shaft and adapted to slide in parallel relation with said shaft, a driven clutching member secured on said shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a brake operating member acted upon by one of said sliding members, yielding means bearing on the other sliding member and adapted to yield under a given determined pressure, elastic means adapted to urge said driving clutching member against said driven clutching member, a projecting member on said other sliding member adapted to move said driving clutching member out of engagement with said driven clutching member, and means for rotating said driving clutching member.

5. A centrifugal servo-brake comprising in combination a rotatable shaft, means for rotating said shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a casing secured on said shaft and enclosing said centrifugal means, a brake operating member acted upon by one of said sliding members and yielding means bearing on the other sliding member and adapted to yield under a given determined pressure.

6. A centrifugal servo-brake comprising in combination a rotatable shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a casing secured on said shaft and enclosing said centrifugal means, a brake operating member acted upon by one of said sliding members, yielding means bearing on the other sliding member and adapted to yield under a given determined pressure, a driving clutching member freely rotatable coaxially with said shaft and adapted to slide in parallel relation with said shaft, a driven clutching member secured on said casing, elastic means adapted to urge said driving clutching member against said driven clutching member, means on said other sliding member for bringing said driving clutching member out of engagement with said driven clutching member, and means for rotating said driving clutching member.

7. A centrifugal servo-brake comprising in combination a rotatable shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a brake operating member acted upon by one of said sliding members, yielding means bearing on the other sliding member and adapted to yield under a given determined pressure, a driving disc rotatably mounted and adapted to slide axially, clutching means on one side of said disc adapted to cooperate with said disc, braking means on the other side of said disc and also adapted to cooperate with said disc, means for rotating said clutching means, elastic means adapted to urge said disc against said braking means, operating means for bringing said disc out of engagement with said braking means and into engagement with said clutching means, and motion transmitting means between said disc and said shaft.

8. A centrifugal servo-brake comprising in combination a rotatable shaft, two sliding members adapted to slide along said shaft, extensible and retractible centrifugal means adapted to be rotated by said shaft and operatively connected with said sliding members, whereby said sliding members are brought nearer each other or farther from each other according as the speed of said shaft is reduced or increased, a brake operating member acted upon by one of said sliding members, yielding means bearing on the other sliding member and adapted to yield under a given determined pressure, a driving disc rotatably mounted and adapted to slide axially, clutching means on one side of said disc adapted to cooperate with said disc, braking means on the other side of said disc and also adapted to cooperate with said disc, means for rotating said clutching means, elastic means adapted to urge said disc against said braking means, operating means for bringing said disc out of engagement with said braking means and into engagement with said clutching means, means for operatively connecting said operating means and said brake operating member, elastic means inserted in said operating means between said connecting means and said disc, and motion transmitting means between said disc and said shaft.

GÉRARD PIERRE PIGANEAU.